3,262,942
CERTAIN 2,3-BENZO-1,3a,4,6a-TETRAAZA-
PENTALENE COMPOUNDS
Rudolph A. Carboni, Wilmington, Del., assignor to E. I.
du Pont de Nemours and Company, Wilmington, Del.,
a corporation of Delaware
No Drawing. Filed Nov. 7, 1963, Ser. No. 322,016
9 Claims. (Cl. 260—308)

This invention relates to polynitrogen heterocyclic compounds having o-phenylene-attached nitrogens. More particularly, this invention relates to monobenzotetraazapentalenes and to substitution products thereof.

Polynuclear nitrogen-containing compounds are an important class of organic materials. Considerable effort has been expended on their preparation. Many have biological activity while others are useful as dyes or as precursors for valuable products, e.g., as dye intermediates. Formerly, many polynuclear compounds containing several ring nitrogen atoms were found to be deficient in stability. Recently, however, polynitrogen heterocyclic compounds having dibenzotetraazapentalene structures have been described (cf. U.S. Reissue 25,238; coassigned copending application Serial No. 252,059, now U.S. Patent 3,166,567) which are both chemically and thermally stable. They withstand degradation on exposure to strong nucleophilic substitution reagents, and their polynitro derivatives have found utility as explosives having unusually high thermal stability.

A new class of polynitrogen heterocyclic compounds has now been found. Specifically, the new products of this invention are 2,3-benzo-1,3a,4,6a-tetraazapentalenes having the following general formula:

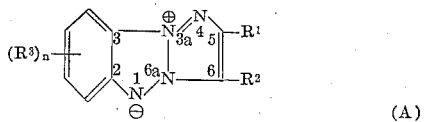

wherein $R^1$ and $R^2$ taken singly represent hydrogen, lower alkyl, lower alkenyl, alkoxycarbonyl (—COOAlkyl) of lower alkyl, tricyanovinyl, nitro, sulfo or halo and taken together represent polymethylene of 3–5 carbons; $R^3$ represents a lower alkyl, lower alkenyl, lower alkadienylene (e.g., —CH=CH—CH=CH—), nitro, sulfo, or halo substituents; and $n$ is a cardinal number up to 2. In the above, "lower" alkyl, alkenyl, and alkadienylene have up to and including 4 carbon atoms.

The preferred compounds have hydrogen on carbon of a heterocyclic ring (i.e., $R^1$ and $R^2$ are hydrogen) since such compounds readily undergo substitution reactions.

The new compounds can be named as 1,5-didehydro-1H,5H-v-triazolo[2,1-a]benzotriazoles, e.g.

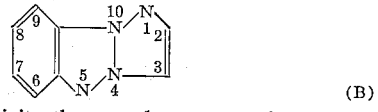

However, for simplicity the pentalene system is used.

In the above didehydrotriazolobenzotriazole structural Formula B there is no indication of the unusual resonance-stabilized charge distribution, which can be shown more satisfactorily by the dipolar ("mesoionic") structure pictured in the preceding general Formula A or by means of a structural Formula C wherein inscribed circles represent the resonance condition, e.g.

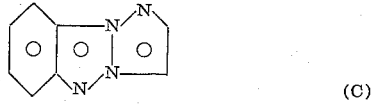

The new compounds of this invention are basic in character, being soluble in aqueous mineral acids such as hydrochloric acid. They are moderately soluble in organic solvents. Although they absorb ultraviolet light, they are generally colorless or slightly yellow in color. In these properties they differ from dibenzotetraazapentalenes. Also, they form tricyanovinyl derivatives which are useful as dyes, whereas the dibenzotetraazapentalenes do not.

The process for obtaining the monobenzotetraazapentalenes of this invention involves decomposition of a 2-(o-azidoaryl)-1,2,3-triazole by heat. The decomposition is generally effected at temperatures of 40–200° C.

The starting materials, i.e., the 2-(o-azidoaryl)-1,2,3-triazoles, are obtained by transformation of the amino group of a 2-(o-aminoaryl)-1,2,3-triazole to the corresponding azide group. This is preferably accomplished by diazotization followed by reaction with an alkali metal azide, preferably sodium azide, under acid conditions at a temperature that is preferably below 20° C., generally 0–10° C. The desired triazole is obtained by reaction of an o-chloronitroaryl with a 1,2,3-triazole in which any nuclear substituents are lower aliphatic hydrocarbon or alkoxycarbonyl groups, and catalytic reduction (Pt catalyst) of the resultant 2-(o-nitroaryl)-1,2,3-triazole to the 2-(o-aminoaryl)-1,2,3-triazole. In the triazole reaction with an o-chloronitroaromatic, two isomers are obtained. There are the 1-(o-nitroaryl)-1,2,3-triazole and the 2-(o-nitroaryl)-1,2,3-triazole. The latter can be separated by fractional crystallization and/or chromatography.

A 2-(o-aminophenyl)benzotriazole can be prepared from an o,o'-diaminoazobenzene. This procedure, together with the other reactions discussed immediately above, are illustrated in Example I below. An alternative method of preparing 2-(o-aminophenyl)benzotriazoles involves reduction of corresponding 2-(o-nitrophenyl)benzotriazoles in a conventional manner, either by use of a reducing agent such as sodium sulfide or by catalytic hydrogenation under mild conditions using low pressure hydrogen, a catalyst such as $PtO_2$, and a suitable neutral solvent medium such as an alcohol or tetrahydrofuran. The resultant 2-(o-aminophenyl)benzotriazoles can be purified by recrystallization in suitable solvents.

Substitution reactions on the preferred products i.e., where $R^1$ and $R^2$ are hydrogen, can take place since these positions (especially $R^2$ are active sites for substitution reactions. Thus, derivatives of the preferred products bearing a variety of substituents can be prepared.

An alternative method of preparing the products of this invention involves reacting a tertiary phosphite or phosphine with a nitroaryl compound wherein one of the carbons ortho to the nitro group is attached to one of two adjoined nitrogen atoms that are, in turn, components of a heterocyclic group or an alkyl or aryl substituted azo group. Details of this reaction are disclosed in the copending coassigned patent application Serial No. 322,033 to James C. Kauer filed concurrently herewith.

The products of this invention are illustrated in further detail by the following examples.

EXAMPLE I

*5,6-tetramethylene-2,3-benzo-1,3a,4,6a-tetraazapentalene*

(a)) A solution of 1.3 g. of 2-(o-aminophenyl)-benzotriazole in 25 ml. of acetic acid was catalytically hydrogenated at 40 p.s.i. using 100 mg. of 10% palladium-on-charcoal catalyst. The solution was filtered, and solvent was removed under vacuum. An ether solution of the residue was washed with dilute sodium carbonate solution. Evaporation of the organic layer yielded colorless crystals of 2-(o-aminophenyl)-4,5-tetramethylene-1,2,3-triazole which after recrystallization from petroleum ether melted at 78–80° C. Alternatively, this compound is named 2-(o-aminophenyl) - 4,5,6,7 - tetrahydrobenzotriazole, a name probably more consistent with Ring Index principles.

*Analysis.*—Calcd. for $C_{12}H_{14}N_4$: C, 67.76; H, 6.59; N, 26.15. Found: C, 67.43; H, 6.51; N, 26.06.

The infrared spectrum showed bands at 3450, 3330, 1620 (strong), 1505, 1480 (strong), 1335, 1310, 1260, 1210, 1150, 1060, 968 (strong), 934, 847, and 742 m$\mu$ (strong).

(b) A solution of 10.3 g. of 2-(o-aminophenyl)-4,5-tetramethylene-1,2,3-triazole in 40 ml. of concentrated hydrochloric acid was diazotized at 5° C. with an aqueous solution of 3.7 g. of sodium nitrite. After stirring for 90 minutes after nitrite addition was complete, the solution was filtered, and an aqueous solution of 3.3 g. of sodium azide was added dropwise to the cold filtrate. The mixture was stirred rapidly at 5° C. for 90 minutes, and the initially formed gummy solid was transformed into yellow crystals (6.3 g.) of 2-(o-azidophenyl)-4,5-tetramethylene-1,2,3-triazole which melted at 48.5–49.6° C. after recrystallization from pentane.

*Analysis.*—Calcd. for $C_{12}H_{12}N_6$: C, 60.00; H, 5.03; N, 34.98. Found: C, 60.49; H, 4.96; N, 35.27.

(c) A solution of 10.3 g. of 2-(o-azidophenyl)-4,5-tetramethylene-1,2,3-triazole in 200 ml. of decalin was heated to reflux for one hour during which time nitrogen was evolved. Most of the decalin was removed by distillation. The residue crystallized and was recrystallized from hexane to yield 4.35 g. of faintly yellow crystalline 4,5-tetramethylene - 2,3 - benzo-1,3a,4,6a-tetraazapentalene which melted at 133° C.

*Analysis.*—Calcd. for $C_{12}H_{12}N_4$: C, 67.90; H, 5.70; N, 26.40. Found: C, 68.32; H, 5.94; N, 26.25.

The ultraviolet spectrum exhibited absorption peaks at 251 m$\mu$ ($\epsilon=28,200$), 278 m$\mu$ ($\epsilon=2,850$) and 242 m$\mu$ ($\epsilon=25,900$).

The 2-(o-aminophenyl)benzotriazole used in part (a) above was obtained as follows:

o,o'-Diaminoazobenzene (4.4 g.) was dissolved in 50 ml. of pyridine. To this solution there was added in portions with stirring 12.8 g. of anhydrous copper sulfate at room temperature. After 30 minutes at room temperature, the reaction mixture was heated on a steam bath for one hour. The pyridine solution was cooled and poured into four volumes of ice water, and extracted with four 150-ml. portions of diethyl ether. The four ether extracts were combined, treated with activated carbon, and dried over anhydrous sodium sulfate. The extract was evaporated to dryness, leaving a yellow oil which solidified on cooling. To the solid there was added petroleum ether and the slurry filtered. The crystalline solid was taken up in hot ethanol and the solution allowed to cool. The yellow crystals which separated on cooling were collected. The yield of 2-(o-aminophenyl)benzotriazole was 64%, based on the weight of the o,o'-diaminoazobenzene used. The product melted at 97° C. to 98° C.

*Analysis.*—Calcd. for $C_{12}H_{10}N_4$: C, 68.55; H, 4.79; N, 26.65. Found: C, 68.55; H, 4.98; N, 26.56.

The ultraviolet spectrum showed maxima at 3570 A. ($\epsilon=9700$), 2960 A. ($\epsilon=12,000$), 2680 A. ($\epsilon=6300$), and 2290 A. ($\epsilon=20,400$).

The infrared spectrum showed bands at 2.98, 3.10, and 6.10$\mu$ which indicates the presence of the $NH_2$ function, and bands at 10.3$\mu$ characteristic of a 2-arylbenzotriazole.

EXAMPLE II

When 2-(o-aminophenyl)-1,2,3-triazole (obtained by reduction of the corresponding nitro compound) is substituted for 2-(o-aminophenyl)-5,6-tetramethylene-1,2,3-triazole in the procedure of Example I(b), 2-(o-azidophenyl)-1,2,3-triazole is obtained, which, when treated in the manner illustrated in Example I(c), yields 2,3-benzo-1,3a,4,6a-tetraazapentalene.

The 2-(o-nitrophenyl)-1,2,3-triazole was prepared by vigorously stirring for 25 hours a mixture of 34.5 g. of 1,2,3-triazole, 150 g. of o-chloronitrobenzene, 50 g. of sodium acetate, and 5 g. of copper powder contained in a 300 ml. flask immersed in an oil bath maintained at 205° C. Acetic acid distilled out of the mixture as the reaction proceeded. The mixture was poured on ice. Methylene chloride was added, and the mixture was filtered. The organic layer was steam distilled to remove o-chloronitrobenzene, and the residue was chromatographed on a column of Woelm neutral activated alumina using methylene chloride as an eluant. The first material eluted was 10.02 g. of 2-(o-nitrophenyl)-1,2,3-triazole. This was recrystallized from pentane-benzene (5:3) at —20° C. to yield white crystals melting at 27.0–27.5° C.

*Analysis.*—Calcd. for $C_8H_6N_4O_2$: C, 50.53; H, 3.18; N, 29.47. Found: C, 50.87; H, 3.30; N, 29.66.

The ultraviolet spectrum exhibited a peak at 238 m$\mu$ ($\epsilon=15,200$) and shoulders at 265 m$\mu$ ($\epsilon=7,350$) and 300 m$\mu$ ($\epsilon=2,400$).

EXAMPLE III

When the process of Example I, parts (b) and (c), is repeated using 2-(o-aminophenyl)-4,5-dimethyl-1,2,3-triazole [Cole and Hamilton, J. Am. Chem. Soc. 68, 1799 (1946)], there is obtained 2,3-benzo-5,6-dimethyl-1,3a, 4,6a-tetraazapentalene.

Additional monobenzenoid-1,3a,4,6a-tetraazapentalenes that are obtained by the general process described above and illustrated by Example I include the following:

7-methyl-1,5-didehydro-1H,5H-v-triazolo[2,1 - a]benzotriazole obtained from 2-(4-methyl-2-nitrophenyl)-1,2,3-triazole which is obtained in turn from 2-chloro-5-methylnitrobenzene and 1,2,3-triazole;

2,3-($\alpha$,$\beta$-naphtho)-1,3a,4,6a-tetraazapentalene obtained from 2-($\beta$-nitro-$\alpha$-naphthyl)-1,2,3-triazole, in turn obtained from 1-chloro-2-nitronaphthalene and 1,2,3-triazole;

7-n-butyl-1,5-didehydro-1H,5H-v-triazolo[2,1 - a]benzotriazole from 2-(4-n-butyl-2-nitrophenyl)-1,2,3-triazole obtained from 2-chloro-5-n-butylnitrobenzene and 1,2,3-triazole;

2,3-benzo-6-methyl-1,3a,4,6a-tetraazapentalene from 4-methyl-2-(o-nitrophenyl)-1,2,3-triazole obtained from o-chloronitrobenzene and 4-methyl-1,2,3-triazole, the latter prepared by reaction of hydrazoic acid with methylacetylene (propyne);

2,3-benzo-6-n-butyl-1,3a,4,6a-tetraazapentalene from 4-n-butyl-2-(o-nitrophenyl) - 1,2,3 - triazole obtained from ochloronitrobenzene and 4-n-butyl-1,2,3-triazole, the latter prepared by reacting hydrazoic acid with n-butylacetylene (1-hexyne);

2,3-benzo-6-vinyl-1,3a,4,6a-tetraazapentalene from 4-vinyl-2-(o-nitrophenyl)-1,2,3-triazole obtained from o-chloronitrobenzene and 4-vinyl-1,2,3-triazole, the latter from the reaction of hydrazoic acid with vinylacetylene;

2,3-benzo-6-carboethoxy - 1,3a,4,6a - tetraazapentalene from 4-carboethoxy-2-(o-nitrophenyl)-1,2,3-triazole obtained from o-chloronitrobenzene and 4-carboethoxy-1,2, 3-triazole, the latter from the reaction of hydrazoic acid and ethyl acetylenecarboxylate;

2,3-benzo-5,6-dicarbomethoxy - 1,3a,4,6a - tetraazapentalene from 4,5-dicarbomethoxy-2-(o-nitrophenyl)-1,2,3-triazole obtained from o-chloronitrobenzene and 4,5-dicarbomethoxy-1,2,3-triazole, the latter being prepared from hydrazoic acid and dimethyl acetylenedicarboxylate;

2,3-($\alpha$,$\beta$-naphtho-6-carbomethoxy) - 1,3a,4,6a-tetraazapentalene from 4-carbomethoxy-2-(2-nitro-1-naphthyl)-1, 2,3-triazole obtained from 1-chloro-2-nitronaphthalene and 4-carbomethoxy-1,2,3-triazole, the latter from the reaction of hydrazoic acid and methyl acetylenecarboxylate;

2,3-($\beta$,$\gamma$-naphtho)-1,3a,4,6a-tetraazapentalene from 2 ($\gamma$-nitro-$\beta$-naphthyl) - 1,2,3 - triazole obtained from 2-chloro-3-nitronaphthalene and 1,2,3-triazole.

As illustrated in Example IV–VI below, 2,3-aryl-1,3a, 4,6a-tetraazapentalenes undergo substitution reactions with nucleophilic reagents. Compounds having hydrogen in the 6-position undergo substitution reactions with suitable reagents in this position first to form, e.g., the 6-nitro-, 6-sulfo-, 6-chloro-, 6-bromo-, 6-iodo-, etc., substituted compounds. The next positions of attack are on the aryl, e.g., benzo, ring wherein up to two groups can be introduced. The 5-position can be substituted by further reaction. A choice of starting materials can be used, e.g., substituted aryls, such as 2-(o-nitro-p-fluorophenyl)-1,2,3-triazole can be used in the process of Example II to yield the corresponding fluoro derivative.

EXAMPLE IV

*6-tricyanovinyl-2,3-benzo-1,3a,4,6a-tetraazapentalene*

A solution of 0.84 g. of 2,3-benzo-1,3a,4,6a-tetraazapentalene in 5 ml. of dimethylformamide was treated with a solution of 0.70 g. tetracyanoethylene in 10 ml. of dimethylformamide. The solution color changed from deep green to deep red. It was warmed on the steam bath for 30 minutes and was then poured on 100 g. of ice. The precipitated deep red 6-tricyanovinyl-2,3-benzo-1,3a,4,6a-tetraazapentalene (0.85 g.) was separated by filtration, washed with water and was dried under a stream of nitrogen. After recrystallization from 125 ml. of benzene and 100 ml. of hexane it melted at 264.5–266° C.

*Analysis.*—Calcd. for $C_{13}H_5N_7$: C, 60.23; H, 1.94; N, 37.83. Found: C, 61.06, 61.00; H, 2.25, 2.06; N, 36.29, 36.69.

The ultraviolet spectrum exhibited peaks at 505 m$\mu$ ($\epsilon=27,500$); 383 m$\mu$ ($\epsilon=6,300$); 322 m$\mu$ ($\epsilon=12,100$); 308 m$\mu$ ($\epsilon=9,756$) and 231 m$\mu$ ($\epsilon=16,620$).

EXAMPLE V

When 2,3-benzo-1,3a,4,6a-tetraazapentalene is reacted with nitric acid, 2,3-(mono- and di-nitrobenzo)-6-nitro-1,3a,4,6a-tetraazapentalene are obtained.

EXAMPLE VI

When Example V is repeated using 2,3-benzo-5,6-dimethyl-1,3a,4,6a-tetraazapentalene, stepwise reaction with nitric acid takes place giving 2,3-(mono- and dinitrobenzo)-5,6-dimethyl-1,3a,4,6a-tetraazapentalene.

Additional substituted monobenzenoid-1,3a,4,6a-tetraazapentalenes that are obtained by the general substitution reaction illustrated by Examples IV–VI include the following:

Reaction of chlorosulfonic acid at about 90° C. with 2,3-benzo-1,3a,4,6a-tetraazapentalene gives 2,3-(chlorosulfonylbenzo)-6-chlorosulfonyl - 1,3a,4,6a - tetraazapentalene.

Addition of chlorine to a solution of 2,3-benzo-1,3a,4,6a-tetraazapentalene in refluxing carbon tetrachloride gives 2,3-(dichlorobenzo)-6-chloro-1,3a,4,6a-tetraazapentalene. Bromine can be substituted for chlorine to give the mono-, di-, or tribromo derivatives.

The nitro groups on the compounds described above can be reduced, e.g., by treatment with hydrogen in the presence of palladium-on-carbon to give the corresponding amino groups from which other groups such as azido, alkoxy, etc., can be obtained.

The compounds of this invention absorb ultraviolet light and are generally colorless. They are useful for ultraviolet light filters and can be used for the preparation of sunburn screening cream, e.g., by forming a homogeneous mixture of triethanolamine, stearic acid, white wax, stearyl alcohol, and the compound of Example II in a ratio of 1/4/4/16/10 followed by dispersion in aqueous glycerol.

Further, the compounds of this invention are useful for preparing tricyanovinyl derivatives in the manner of Example IV. These compounds in turn are useful as dyes as illustrated in the following example.

EXAMPLE A

A solution of 0.025 g. of the tricyanovinyl-2,3-benzo-1,3a,4,6a-tetraazapentalene obtained in Example IV in 3 ml. of acetone was added to 50 ml. of boiling water to which two drops of a wetting agent had been added. Small swatches of cloth (3 x 3 cm.) were added. The solution was boiled for five minutes, and the swatches were removed, washed thoroughly with soap and water, rinsed with water, and dried. Acetate was dyed a deep rose, and "Dacron" polyester fiber and nylon were dyed salmon pink.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

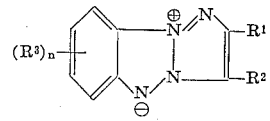

wherein $R^1$ and $R^2$ taken singly represent a member of the group consisting of hydrogen, lower alkyl, lower alkenyl, alkoxycarbonyl of lower alkyl, tricyanovinyl, nitro, sulfo, and halo and taken together represent polymethylene of 3 to 5 carbon atoms, $R^3$ represents a member of the group consisting of lower alkyl, lower alkenyl, lower alkadienylene, nitro, sulfo, and halo, and $n$ is a cardinal number of up to and including two.

2. A compound as defined in claim 1 wherein $R^1$ and $R^2$ each represent hydrogen and $R^3$ represents nitro.

3. A compound as defined in claim 1 wherein $R^1$ and $R^2$ each represents alkoxycarbonyl of lower alkyl and $n$ is zero.

4. A compound as defined in claim 1 wherein $R^1$ represents hydrogen and $R^2$ and $R^3$ each represents nitro.

5. A compound as defined in claim 1 wherein $R^1$ and $R^2$ together represent polymethylene of 3 to 5 carbon atoms and $n$ is zero.

6. 6 - tricyanovinyl - 2,3 - benzo - 1,3a,4,6a - tetraazapentalene.

7. 2,3-benzo-1,3a,4,6a-tetraazapentalene.

8. 5,6 - tetramethylene - 2,3 - benzo - 1,3a,4,6a-tetraazapentalene.

9. 5,6-dimethyl-2,3-benzo-1,3a,4,6a-tetraazapentalene.

No references cited.

HENRY R. JILES, *Acting Primary Examiner.*

A. D. ROLLINS, *Assistant Examiner.*